United States Patent [19]

Ropars et al.

[11] Patent Number: 4,642,264
[45] Date of Patent: Feb. 10, 1987

[54] THERMOSET POLYMERS AND PREPOLYMERS WITH RAPID CURING, OBTAINED BY POLYCONDENSATION OF PYRIDINE DERIVATIVES AND AROMATIC DIALDEHYDES AND ADDING OF PHENOLIC COMPOUNDS

[75] Inventors: Marcel Ropars, Rocquencourt; Bertrand Bloch, Paris, both of France

[73] Assignees: Societe Nationale des Poudres et Explosifs, Paris; Office National d'Etudes et de Recherches Aerospatiales, Chatillon sous Bagneaux, both of France

[21] Appl. No.: 643,811

[22] Filed: Aug. 23, 1984

[30] Foreign Application Priority Data

Sep. 13, 1983 [FR] France .................................. 84 14547

[51] Int. Cl.$^4$ ...................... C08G 14/06; C08G 14/12
[52] U.S. Cl. ................................... 428/367; 428/524; 524/99; 524/104; 524/110; 524/111; 524/205; 524/259; 524/323; 524/337; 524/597; 525/503; 525/504; 528/153; 528/155; 528/163; 528/232; 528/242; 528/245

[58] Field of Search ............... 528/153, 155, 163, 232, 528/242, 245; 525/503, 504; 524/99, 104, 110, 111, 205, 337, 323, 259, 597; 428/367, 524

[56] References Cited

U.S. PATENT DOCUMENTS

| | | | |
|---|---|---|---|
| 3,526,611 | 9/1970 | Webb | 528/163 X |
| 3,784,514 | 1/1974 | Tiedeman | 525/503 X |
| 3,994,862 | 11/1976 | Ropars et al. | 528/232 |
| 4,500,690 | 2/1985 | LaTulip | 525/504 X |
| 4,525,573 | 6/1985 | Ropars et al. | 528/232 |

*Primary Examiner*—Howard E. Schain
*Attorney, Agent, or Firm*—Bucknam and Archer

[57] ABSTRACT

The object of the present invention are new thermoset resins having quickened curing, a process for their preparation, and their applications. The resins according to the invention consist, at least in part, of the products resulting from the polycondensation of one or more pyridine derivatives containing at least two methyl groups in the 2, 4 or 6 positions, with one or more aromatic dialdehydes, and the addition of one or more additives consisting of phenol compounds. These resins are used to the fabrication of composite materials.

15 Claims, No Drawings

THERMOSET POLYMERS AND PREPOLYMERS WITH RAPID CURING, OBTAINED BY POLYCONDENSATION OF PYRIDINE DERIVATIVES AND AROMATIC DIALDEHYDES AND ADDING OF PHENOLIC COMPOUNDS

The invention relates to new thermosetting resins exhibiting rapid curing, prepared from substituted pyridines, and to a process for their preparation and to their applications.

It is known that the polycondensation reaction between one or more pyridine derivatives containing at least two methyl groups respectively on at least two of the 2, 4 or 6 positions, in particular 2,4-dimethylpyridine, 2,6-dimethylpyridine, and 2,4,6-trimethylpyridine, and one or more aromatic dialdehydes, in particular terephthaldehyde, leads to thermosetting resins endowed with a high thermal stability and well adapted for use as matrices in fibre-reinforced composite materials having good mechanical properties, particularly at high temperatures (up to 450° C., the working life clearly depending on the temperature).

These resins, hereinafter called "PSP resins", as well as their preparation and applications are in particular the subject of French Pat. Nos. 2 261 296 and 2 261 297.

However, being thermosetting resins, these products are thermosetting only at a relatively high temperature. The result is that the minimum heat treatment temperature in the first stage of curing in order to produce gelling is about 180° C., or preferably about 200° C. if one wishes this process to take place in a reasonable period of time (about 1 to 2 hours), and that the time required for consolidation or hardening is relatively long (between about 3 and 8 hours). A post-treatment at a higher temperature (about 250° C.) during at least 10 hours is also necessary in order to obtain complete infusibility and an optimum level of thermal mechanical properties.

This moderate reactivity may represent an advantage in certain cases. When, for example, it is desired to fabricate a piece of composite material by injecting molten resin into a fibre reinforcement core previously placed in a mould, it is necessary to operate at fairly high temperatures so that the viscosity of the resin is sufficiently reduced; it is absolutely essential in this case to avoid any danger of premature gelling, however isolated, during the injection operation, and it is for this reason, among other advantages of use, that PSP resins are found to be ideally suitable for such an application.

The fact that PSP resins require high temperatures in order for curing to occur may however be a disadvantage in other areas of application, which is particularly the case when the demands of mass production involve high production output levels, or when the occupation time of the moulding material represents a not inconsiderable proportion of the cost price of the article, or also when the required temperature cannot be reached in the equipment available.

The present invention enables these factors to be remedied when they constitute a disadvantage.

The inventors have in fact found surprisingly that the addition to PSP resins of one or more additives consisting of phenolic compounds leads to new thermosetting resins the curing, of which for a given temperature, is accelerated compared with the known PSP resins, or where the curing temperature is reduced compared with that of the known PSP resins.

It was unforeseeable in fact, with the present state of knowledge concerning the cross-linking mechanism of PSP resins, that the work on which the present invention was based would show that the addition of compounds possessing one or more phenolic groups would result in new resins the heat curing behaviour of which is modified compared with PSP resins in the sense of, on the one hand, an acceleration at a given temperature of the various stages of this transformation (gelling, consolidation/hardening, suppression of fusibility) and, on the other hand, of a reduction in the temperatures required to carry out these various stages.

The object of the invention are thus new thermosetting polymers exhibiting accelerated curing, consisting at least in part of the products of the polycondensation reaction of one or more pyridine derivatives containing at least two methyl groups in the 2, 4 or 6 positions with one or more aromatic dialdehydes, and the addition of an additive consisting of a phenolic compound.

The resins according to the invention may be prepared by condensing the methylated pyridine derivative with the aromatic dialdehyde according to the process as described in French Patents Nos. 2 261 296 and 2 261 297, in order to obtain a PSP resin and then adding an additive consisting of a phenolic compound to the PSP resin thus formed.

In this case, the PSP resin resulting from the condensation of the pyridine derivative and the aromatic dialdehyde must be at a temperature such that gelling does not take place and the additive can be mixed in. This temperature is generally around 60° C.

The resins according to the invention may also be prepared by mixing all the necessary reactants, namely the pyridine derivative, the aromatic dialdehyde and the phenolic compound, in the reactor. The phenolic compounds used to prepare resins according to the invention are selected from among the following:

monophenols such as hydroxybenzene,
  alkylphenols substituted by one or more alkyl chains containing 1 to 5 carbon atoms such as cresols, unsubstituted arylphenols or arylphenols substituted by one or more alkyl chains containing 1 to 5 carbon atoms, the phenols containing 2 to 4 condensed aromatic nuclei;

polyphenols containing 2, 3 or 4 phenol groups, such as diphenols, possibly arylated or alkylated by one or more chains containing 1 to 5 carbon atoms and/or condensed nuclei;

phenols substituted by one or more hydroxyl, carboxyl, amine or ether groups;

phenolic polymers and in particular formaldehyde-phenol resins formed by condensing phenol and formaldehyde.

Among these phenolic compounds that may be used to produce resins according to the invention, the following compounds are advantageously employed: hydroxybenzene, pyrocatechol, resorcinol, hydroquinone, alpha-naphthol, meta-cresol, novolak resins prepared from formaldehyde and phenol in which the phenol is in excess with respect to the formaldehyde (from the point of view of equimolarity) and in which the catalyst used is an acid, formaldehyde-phenol resols prepared from phenol and formaldehyde, the formaldehyde being in excess with respect to the phenol (from the point of view of equimolarity) and the catalyst being a base.

As novolak resin, there may advantageously be used that resin obtained with 1.38 moles of phenol and 1.14 moles of formaldehyde and catalysed by oxalic acid.

As formaldehyde-phenol resol there may advantageously be used those of the type marketed by French firm, Rhone Poulenc, under the identification RA 101.

The influence of the phenol additives on the acceleration of the curing of the resins varies from one additive to another.

Resorcinol is one of the preferred additives for formulating resins according to the invention.

The amount of additive to be added to the product resulting from the condensation of the pyridine derivative and aromatic dialdehyde should be such that the resins according to the invention preserve the mechanical and thermal properties exhibited by PSP resins.

In general, the proportion of the additives used in the formulation of the resins according to the invention is about 1% to about 20% and is preferably between about 2% and about 10% by weight with respect to the total weight of the resin when the additive is not a macromolecular compound.

When formaldehyde-phenol resins are used as additives, these formaldehyde-phenol resins have, parallel to their ability to accelerate curing, the advantage of being miscible in all proportions with PSP resins. Furthermore, the resins according to the invention containing formaldehyde-phenol resins as additives are thermosetting. This characteristic is particularly remarkable when novolak resins, which are not by themselves thermosetting, are used as additives; in this case the novolak resins act as a curing accelerator with respect to the PSP resins, while the PSP resins act as a curing agent with respect to the novolak resins.

The amount of formaldehyde-phenol resins used mixed with the PSP resins in order to give the resins of the invention may be at least equal to about 50% by weight with respect to the total weight of the resin.

The resins according to the invention may be kept at ambient temperature until subsequently used. These resins may be employed in accordance with the various conventional techniques relating to thermosetting resins. When they are in the form of powder they may be formed and shaped by compression moulding, but may also be dissolved in a solvent, or melted.

The resins according to the invention, particularly when the amounts of additives remain relatively low (less than or equal to 10% by weight with respect to the total weight of the resin), preserve the advantageous characteristics of PSP resins, namely their high thermal stability and excellent fire behaviour. When the additive is a formaldehyde-phenol resin, these advantageous characteristics may be preserved far beyond this amount of 10% by weight.

The invention also covers the application of these new resins to the production of composite materials, particularly in the form of laminates, obtained in a conventional manner by impregnating fibrous fillers, particularly mineral and/or refractory fillers, by means of a thermosetting resin which is then subjected to a heat curing treatment under pressure. The fibres are then finally embedded in the polymer.

The value of being able to fabricate articles from moulding powders and short impregnated fibres resides mainly in the speed of the operation, making high production output levels possible.

The following examples illustrate the carrying out of the invention.

EXAMPLE 1

Varying amounts of different phenol compounds are added to the PSP resin 6022P obtained by condensing collidine with terephthaldehyde (industrial product manufactured by SNPE). The gelling times of these mixtures are measured at 200° C. by means of a device that enables the start of the increase in the load moment of a metal rod immersed in the product and turning at low speed to be detected.

The following results were obtained and are shown in Table 1 hereinbelow.

TABLE I

| Phenol compound | Concentration (% by wt. with respect to the total amount of resin) | Gelling time (minutes) |
| --- | --- | --- |
| Phenol | 30 | 100 |
| Hydroquinone | 30 | 85 |
| Resorcinol | 10 | <5 |
| Pyrocatechol | 10 | 45 |
| Alpha-naphthol | 10 | 60 |
| Meta-cresol | 10 | 90 |

In the case of pure PSP resins, that is to say not containing any phenol compounds, the gelling time is 120 minutes.

This table thus clearly demonstrates the variable but marked influence of the various phenol compounds used, as well as the substantially greater activity of resorcinol compared with all the other phenol compounds.

EXAMPLE 2

Operations similar to those in Example 1 were carried out, in all cases using resorcinol as additive, but added at varying concentrations and operating at different temperatures. The results show that the activity of resorcinol is substantial, even at low concentration, and enables gelling to take place at temperatures as low as 130° or 150° C. The gelling times (in minutes) obtained at different temperatures for different percentages of resorcinol are shown in Table II hereinbelow.

TABLE II

| Resorcinol (% by wt. with respect to the total amount of resin) | Temperature | | | |
| --- | --- | --- | --- | --- |
| | 130° | 150° | 175° | 200° |
| 0 | — | — | — | 120 mn. |
| 2 | — | — | 105 mn | 52 mn |
| 5 | 130 mn | 52 mn | — | — |
| 10 | 70 mn | 25 mn | — | — |
| 20 | 17 mn | 8 mn | — | — |

The influence of resorcinol is also appreciable as regards the consolidation and hardening, and infusibility of the gelled samples. Thus, in the case of a resin containing 5% of resorcinol, this infusibility is obtained in 80 minutes. For a resin containing 10% of resorcinol, this time is reduced to 40 minutes, whereas the pure PSP resin, that is to say not containing any phenol compounds, requires 360 minutes in order to reach the same degree of curing.

EXAMPLE 3

A laminate reinforced with carbon fabric was produced using a resin according to the invention obtained from 95% of PSP resin and 5% of resorcinol.

In this application, a solution of type 6022P resin to which 5% of resorcinol was added, and at a concentration of about 50% in methylethylketone, was used to impregnate 8 plies of Toray T300 carbon fibre fabric (fabric 43377 Stevens-Genin). After drying, the 8 plies are stacked in a mould, which was then placed between the plates of a press preheated to 150° C.

A squeezing pressure was then applied after 15 minutes and this pressure was gradually raised to 12 bars over 55 minutes (for the same operation the pure PSP resin would have required 75 minutes at 200° C.).

After 2 hours' resting time at 150° C., the stack of plies was subjected to successive increments of 1 hour at 175° C., 200° C., 225° C. and 250° C.

After removal from the mould, the plaque obtained, containing 57% by volume of fibres, was subjected to mechanical tests. Its resistance was 420 MPa at 20° C. and 375 MPa at 250° C., which shows that its curing was effectively complete (in order to reach this stage, the PSP resin would require a post-curing of 16 hours at 250° C.).

EXAMPLE 4

The accelerated curing of PSP resins by formaldehyde-phenol resins was demonstrated by measuring the gelling times at 180° and 200° C. of different resins formed by mixing a PSP resin and a formaldehyde-phenol resin under the same conditions as those described in Example 1.

The gelling times (in minutes) obtained with the two types of formaldehyde-phenol resins at two different temperatures are shown in Table III hereinbelow.

TABLE III

| % by wt. of formaldehyde-phenol resin with respect to the total amount of resin | Novolak | | Resol | |
| --- | --- | --- | --- | --- |
| | 180° | 200° | 180° | 200° |
| 0 | 270 mn. | 115 mn | 270 mn | 115 mn |
| 10 | 160 | 70 | 135 | 50 |
| 20 | 100 | 30 | 80 | 25 |
| 30 | 70 | 25 | 30 | 15 |
| 40 | 50 | 22 | 20 | 10 |
| 50 | 45 | 19 | 10 | 5 |

This formaldehyde-phenol resin consisted, in one series of tests, of the novolak resin prepared from 1.38 moles of phenol and 1.14 moles of formaldehyde, and in a second series of tests, of a resol of type RA 101 marketed by Rhone Poulenc.

These results clearly demonstrate the influence of these additives and for the type of PSP resin used the resin according to the invention obtained with the resol has a much quicker curing than the resin obtained with the novolak resin.

We claim:

1. A thermoset resin consisting at least in part of a product resulting from the polycondensation of at least one pyridine derivative containing at least two methyl groups in the 2, 4 and 6 positions, with at least one aromatic dialdehyde, and one additive which is at least one phenol compound, wherein the phenol compound is a member selected from the group consisting of:
    (a) a monophenol which is hydroxybenzene, an alkylphenol substituted by one or more alkyl having 1 to 5 carbon atoms, unsubstituted aryl phenol or an aryl phenol substituted by one or more alkyl having 1 to 5 carbon atoms, a phenol containing 2 to 4 condensed aromatic rings;
    (b) a polyphenol having 2, 3 or 4 phenol groups, said polyphenol being unsubstituted or substituted by (1) aryl group, (2) by one or more alkyl having 1 to 5 carbon atoms, (3) by a condensed ring and (4) by an alkyl of 1 to 5 carbon atoms and a condensed ring;
    (c) a phenol substituted by one or more hydroxy, carboxy, amine or ether group, and
    (d) a phenol polymer, said phenyl compound not containing isopropenyl groups.

2. A thermoset resin according to claim 1, wherein the phenol polymer is a formaldehyde phenol resin.

3. A thermoset resin according to claim 1, wherein said phenol compound is hydroxybenzene, a, an unsubstituted arylphenol, an arylphenol substituted by one or more alkyl having 1 to 5 carbon atoms.

4. A thermoset resin according to claim 1, wherein the phenol compound is a member selected from the group consisting of hydroxybenzene, pyrocatechol, resorcinol, hydroquinone and alpha-naphthol.

5. A thermoset resin according to claim 4, wherein the phenol compound is resorcinol.

6. A thermoset resin according to claim 1, wherein the proportion of the phenol compound is between 1% and 20% by weight with respect to the total weight of the resin.

7. A thermoset resin according to claim 6, wherein the proportion of the phenol compound is 2%–10% by weight with respect to the total weight of the resin.

8. A thermoset resin according to claim 1, wherein the pyridine derivative is 2,4,6-trimethylpyridine, the aromatic dialdehyde is terephthalic aldehyde, and the phenol compound is hydroxybenzene, hydroquinone, resorcinol, pyrocatechol or, alpha-naphthol.

9. The thermoset resin according to claim 2, wherein the amount of formaldehyde-phenol resin is up to 50% of the total weight of the resin.

10. A thermoset resin according to claim 1, wherein the pyridine derivative is collidine, the aromatic dialdehyde is terephthaldehyde, the phenol is resorcinol in the amount of 10% of the total weight of the resin, and the gelling time is less than 5 minutes at 200° C.

11. A thermoset resin according to claim 1, wherein the phenol is resorcinol in the amount of 5% with respect to the total weight of the resin and the gelling time at 130° C. is 130 minutes.

12. A thermoset resin according to claim 2, wherein the gelling time is 70 minutes at 180° C. when said phenolformaldehyde resin is added in the amount of 30% by weight.

13. A thermoset resin according to claim 1 which is in the form of a moulding powder.

14. A composite material of fibrous fillers impregnated with a resin according to claim 1.

15. A composite material according to claim 14, wherein the fillers are at least one of mineral and refractory fillers and the composite is in the form of a laminate.

* * * * *